(12) United States Patent
Lin et al.

(10) Patent No.: US 8,556,233 B2
(45) Date of Patent: Oct. 15, 2013

(54) FIELD REMOVABLE BONNET ASSEMBLIES FOR USE WITH VALVES

(75) Inventors: Chun Lin, McKinney, TX (US); Matthew William Hanusa, McKinney, TX (US); Roy Ronald Pelfrey, Sherman, TX (US); Eric Alan Miller, McKinney, TX (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 13/407,314

(22) Filed: Feb. 28, 2012

(65) Prior Publication Data

US 2012/0153202 A1 Jun. 21, 2012

Related U.S. Application Data

(63) Continuation of application No. 12/247,854, filed on Oct. 8, 2008, now Pat. No. 8,146,885.

(51) Int. Cl.
*F16K 31/44* (2006.01)

(52) U.S. Cl.
USPC ........... 251/214; 251/258; 251/263; 277/375; 277/526

(58) Field of Classification Search
USPC .................. 251/214, 257, 258, 261, 263, 321
See application file for complete search history.

(56) References Cited

U.S. PATENT DOCUMENTS

| 59,837 A | 11/1866 | Harsen |
| 121,985 A | 12/1871 | Bolthoff |
| 148,285 A | 3/1874 | Cornelius |
| 419,076 A | 1/1890 | Roovers |
| 806,970 A * | 12/1905 | Gold .......................... 251/257 |
| 851,147 A | 4/1907 | Willings |
| 877,706 A | 1/1908 | Duffy |

(Continued)

FOREIGN PATENT DOCUMENTS

| EP | 0063452 | 10/1982 |
| GB | 977351 | 12/1964 |
| GB | 1174469 | 12/1969 |

OTHER PUBLICATIONS

Patent Cooperation Treaty "Written Opinion," issued in connection with PCT application No. PCT/US2009/054628, mailed Nov. 19, 2009, 6 pages.

(Continued)

*Primary Examiner* — John Rivell
*Assistant Examiner* — Matthew W Jellett
(74) *Attorney, Agent, or Firm* — Hanley, Flight and Zimmerman, LLC (57) ABSTRACT

Field removable bonnet assemblies for use with valves are disclosed. An example internal valve includes an internal valve body and a field removable bonnet assembly. The field removable bonnet assembly includes a body that is to be removably coupled to the internal valve body and a shaft to be at least partially positioned within the body. The field removable bonnet assembly also includes an adjuster including a first adjuster portion and a second adjuster portion. The body defines a bore having a first diameter portion and a second diameter portion larger than the first diameter portion. The first diameter portion is to receive a valve packing. The second diameter portion to be threadably engaged by the second adjuster portion. The adjuster is externally accessible to adjust the first adjuster portion within the first diameter portion to change a force exerted by the valve packing on the shaft.

17 Claims, 4 Drawing Sheets

(56) References Cited

U.S. PATENT DOCUMENTS

| | | | |
|---|---|---|---|
| 943,837 | A | 12/1909 | Miller |
| 1,742,307 | A | 1/1930 | Eble |
| 2,374,960 | A | 5/1945 | Russell |
| 2,570,098 | A | 10/1951 | Carlstedt |
| 3,631,893 | A | 1/1972 | Seaman et al. |
| 3,844,312 | A | 10/1974 | Sumner et al. |
| 4,269,215 | A | 5/1981 | Odar |
| 4,886,241 | A | 12/1989 | Davies et al. |
| 4,936,197 | A | 6/1990 | Brent |
| 5,358,212 | A | 10/1994 | Soltys et al. |
| 5,549,276 | A | 8/1996 | Pittman et al. |
| 5,791,629 | A * | 8/1998 | Wears et al. .................. 251/214 |
| 7,980,530 | B2 * | 7/2011 | Mahncke et al. ............. 251/214 |
| 8,146,885 | B2 * | 4/2012 | Lin et al. ....................... 251/214 |
| 2005/0098966 | A1 | 5/2005 | Canova |
| 2005/0200081 | A1 | 9/2005 | Stanton et al. |
| 2006/0208211 | A1 | 9/2006 | Bush et al. |
| 2010/0084596 | A1 | 4/2010 | Lin et al. |

OTHER PUBLICATIONS

Patent Cooperation Treaty "Search Report," issued in connection with PCT application No. PCT/US2009/054628, mailed Nov. 19, 2009, 5 pages.

Patent Cooperation Treaty "International Preliminary Report on Patentability," issued in connection with PCT application No. PCT/US2009/054628, mailed Apr. 12, 2011, 7 pages.

United States Patent and Trademark Office, "Notice of Allowance," issued in connection with U.S. Appl. No. 12/247,854, mailed on Nov. 28, 2011, 8 pages.

United States Patent and Trademark Office, "Non-Final Rejection," issued in connection with U.S. Appl. No. 12/247,854, mailed on Aug. 8, 2011, 12 pages.

* cited by examiner

FIELD REMOVABLE BONNET ASSEMBLIES FOR USE WITH VALVES

RELATED APPLICATIONS

This patent arises from a continuation of U.S. patent application Ser. No. 12/247,854, filed on Oct. 8, 2008, which is hereby incorporated herein by reference in its entirety.

FIELD OF THE DISCLOSURE

This patent relates generally to field removable bonnet assemblies and, more specifically, to field removable bonnet assemblies for use with valves.

BACKGROUND

Internal valves are used in a variety of commercial and industrial applications to control fluid flow between a fluid storage container and another container, hose, pipeline, etc. Typically, internal valves are provided with a bonnet assembly that includes a shaft coupled to a cam that rotatably engages a stem to open and close the internal valve.

Bonnet assemblies of known internal valves include a spring that exerts a force on a valve packing to urge the valve packing against a portion of the shaft. The engagement between the valve packing and the shaft creates a substantially bubble tight seal to prevent fluid from exiting through the bonnet assembly. In time, the resilience of the valve packing and the amount of force that the spring exerts on the valve packing decrease, which may enable fluid to exit through the bonnet assembly between the shaft and the valve packing.

In some instances, the fluid storage container in which the internal valve is mounted is located in a rural location in which repair technicians and/or replacement parts are not readily available. As a result, if a bubble tight seal does not exist between the shaft and the valve packing, the internal valve may be inoperable and/or a considerable amount of fluid may exit through the bonnet assembly before the internal valve is repaired and/or replaced.

SUMMARY

An example internal valve includes an internal valve body and a field removable bonnet assembly. The field removable bonnet assembly includes a body that is to be removably coupled to the internal valve body and a shaft to be at least partially positioned within the body. The field removable bonnet assembly also includes an adjuster including a first adjuster portion and a second adjuster portion. The body defines a bore having a first diameter portion and a second diameter portion larger than the first diameter portion. The first diameter portion is to receive a valve packing. The second diameter portion is to be threadably engaged by the second adjuster portion. The adjuster is externally accessible to adjust the first adjuster portion within the first diameter portion to change a force exerted by the valve packing on the shaft.

An example internal valve includes an internal valve body and a stem. The internal valve also includes a field removable bonnet assembly. The field removable bonnet assembly includes a body to be removably coupled to the internal valve body. The body defines a bore to receive a valve packing. The field removable bonnet assembly also includes a shaft to be at least partially positioned within the bore and an adjuster to be entirely positioned within the bore and externally accessible to adjust the adjuster and change a force exerted by the valve packing on the shaft.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The example field removable bonnet assemblies described herein advantageously enables a technician to externally adjust a force exerted by a valve packing on a shaft of an internal valve to substantially prevent fluid from exiting the internal valve to the atmosphere, which eliminates the problems associated with bonnet assemblies of known internal valves. In particular, the examples described herein are provided with a removable adjuster that can be externally adjusted to change a force exerted by a valve packing on a shaft. Additionally, the removable adjuster may be advantageously removed in the field while the internal valve is coupled to a service line or chamber to replace and/or repair the valve packing, a spring and/or packing rings within the example field removable bonnet assembly. Further, the example field removable bonnet assemblies may be advantageously removed from the internal valve in the field while the internal valve is coupled to a service line or chamber to replace and/or repair the field removable bonnet assembly.

In some examples described herein, the removable adjuster defines a plurality of slots that enables a technician to externally adjust the removable adjuster relative to the internal valve. The position of these slots relative to the internal valve may indicate the position of the removable adjuster and, specifically, indicate the amount that the removable adjuster may be adjusted to further compress the valve packing. In other examples described herein, the removable adjuster includes an elongated member that extends from a body of a bonnet to enable a technician to externally adjust the removable adjuster relative to the internal valve. This elongated member may have a laser marking or other markings to indicate the position of the removable adjuster and, specifically, indicate the amount that the removable adjuster may be adjusted to further compress the valve packing.

Figure 1:
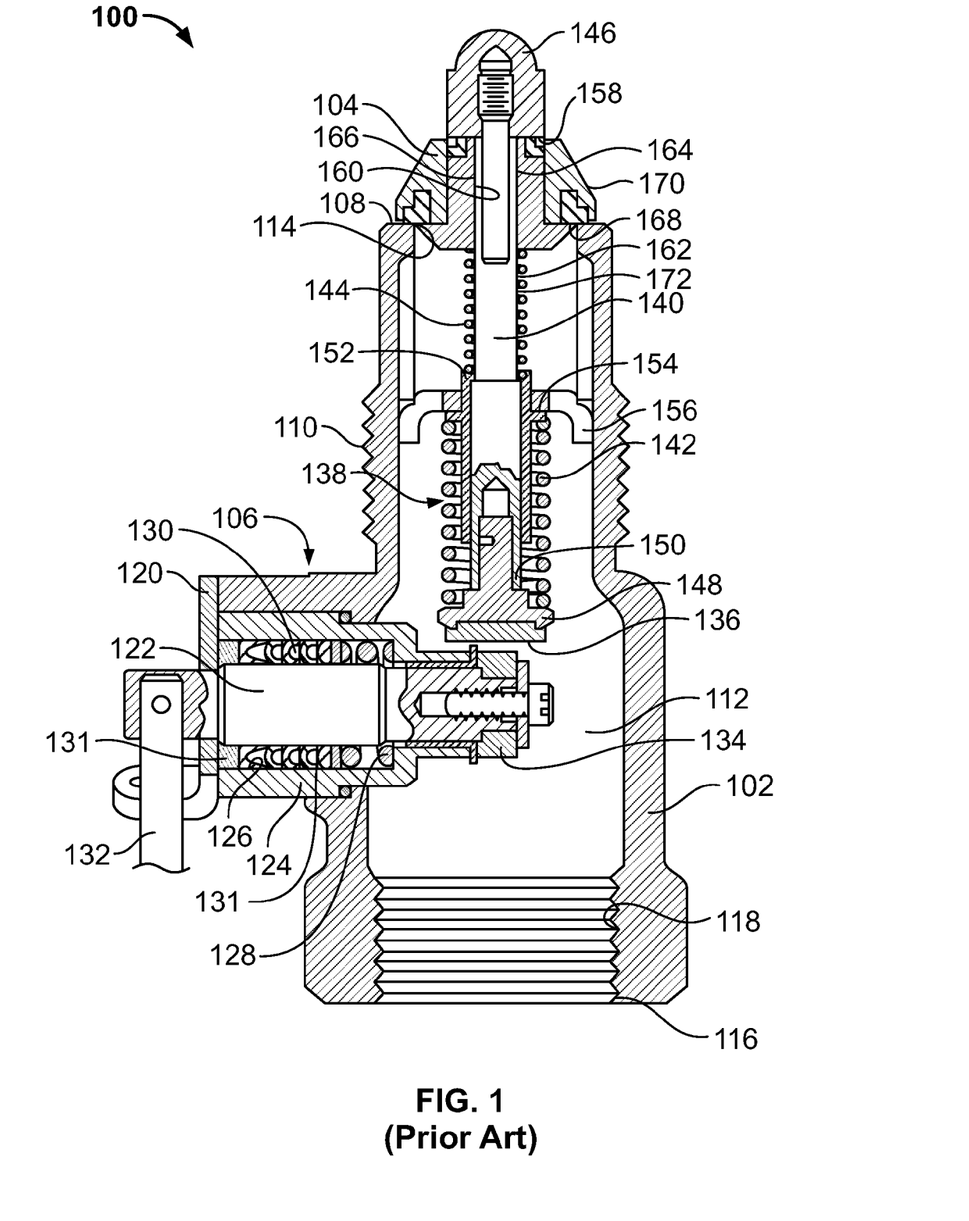
FIG. 1 depicts a known internal valve.

FIG. 1 depicts a known internal valve 100 that has a body 102, a poppet 104, and a bonnet assembly 106. The bonnet assembly 106 is coupled to the body 102 and the poppet 104 sealingly engages a surface 108 of the body 102 to control fluid flow through the internal valve 100.

The body 102 includes exterior threads 110 that engage an opening (not shown) of a chamber or tank (not shown) such as a pumping system, a stationary storage tank, transport truck, etc. Additionally, the body 102 defines a bore 112 having a first opening 114 and a second opening 116 to fluidly couple the chamber or tank to another chamber, a hose, a pipeline, etc. Specifically, the bore 112 includes internal threads 118 to threadingly engage another body (not shown) such as, for example, a coupling of an LPG hose.

The bonnet assembly 106 is coupled to the body 102 via a plate 120. The bonnet assembly 106 includes a shaft 122 that is partially positioned within and rotationally coupled to a bonnet 124. Specifically, a portion of the shaft 122 is positioned within a bore 126 defined by the bonnet 124 along with a spring 128 that exerts a force against a valve packing 130 to urge the valve packing 130 against the shaft 122 to substantially prevent fluid from exiting through the bonnet assembly 106 between the shaft 122 and the valve packing 130. Additionally, packing rings 131 are positioned on either side of the valve packing 130 and engage the plate 120 and the spring 128. The plate 120 positions the spring 128, the valve packing 130 and the packing rings 131 within the bore 126. Typically, the engagement between the shaft 122 and the valve packing 130 of newly manufactured bonnet assemblies 106 creates a bubble tight seal that prevents fluid from exiting through the bonnet assembly 106. However, exposure to substances and/or chemicals corrode the spring 128 and/or the valve packing 130, which degrades this bubble tight seal and, as a result, may enable fluid to exit through the bonnet assembly 106.

The shaft 122 includes an external lever 132 to rotate the shaft 122 relative to the bonnet 124 and the body 102. A cam 134 is coupled to the shaft 122 opposite the external lever 132 and is positioned within the bore 112. As the shaft 122 is rotated, the cam 134 engages a surface 136 to move a stem assembly 138 within the bore 112.

The stem assembly 138 includes a stem 140, a first spring 142, a second spring 144 and a plug 146. A first spring seat 148 is coupled to an end 150 of the stem 140 and is positioned opposite a second spring seat 152 that surrounds the stem 140. A surface 154 of the second spring seat 152 engages a guide bracket 156 that guides the stem 140 relative to the body 102. The first spring 142 is positioned between the first spring seat 148 and the second spring seat 152 and the second spring 144 is positioned between the second spring seat 152 and the poppet 104. The plug 146 is coupled to the stem 140 opposite the first spring seat 148 and engages a seating surface 158 defined by the poppet 104. Additionally, a portion of the stem 140 is positioned within an aperture 160 defined by the poppet 104 adjacent the seating surface 158.

In practice, to equalize a pressure between a chamber or tank in which the internal valve 100 is mounted and the other chamber, hose, pipeline, etc. coupled to the second opening 116, the external lever 132 is rotated to position the cam 134 at a mid-point (e.g., 70° travel), which moves the stem assembly 138 to disengage the plug 146 from the seating surface 158 and positions a cut-away portion or groove 162 of the stem 140 adjacent to the aperture 160. Positioning the cut-away portion or groove 162 adjacent to the aperture 160 increases the size of a fluid flow channel 164 between the stem 140 and a surface 166 of the aperture 160, which enables a relatively large amount of fluid to bleed between the chamber or tank and the other chamber, hose, pipeline, etc. to equalize the pressure across the internal valve 100.

Once the fluid pressure is equalized, the internal valve 100 may be fully opened. Specifically, the external lever 132 may be rotated to position the cam 134 at a high-point, which moves the stem assembly 138 to enable a seating surface 168 of the poppet 104 to disengage the surface 108 to allow fluid to flow from the chamber, tank, etc. in which the internal valve 100 is mounted through the first opening 114 to the second opening 116. However, if the fluid flow increases to a magnitude greater than a predetermined fluid flow (e.g., an excess flow limit), a force exerted by the fluid flow against an external surface 170 of the poppet 104 overcomes a force exerted by the second spring 144 and causes the seating surface 168 of the poppet 104 to reengage the surface 108 even though the cam 134 is positioned at the high-point. In this position, while the seating surface 168 of the poppet 104 engages the surface 108, the plug 146 is at a distance from the seating surface 158 and a cylindrical portion 172 of the stem 140 is positioned adjacent the aperture 160. Positioning the cylindrical portion 172 adjacent the aperture 160 decreases the size of the fluid flow channel 164 between the stem 140 and the surface 166 of the aperture 160, which enables a relatively small amount of fluid to bleed between the chamber or tank in which the internal valve 100 is mounted and the second opening 116.

Figure 2A:
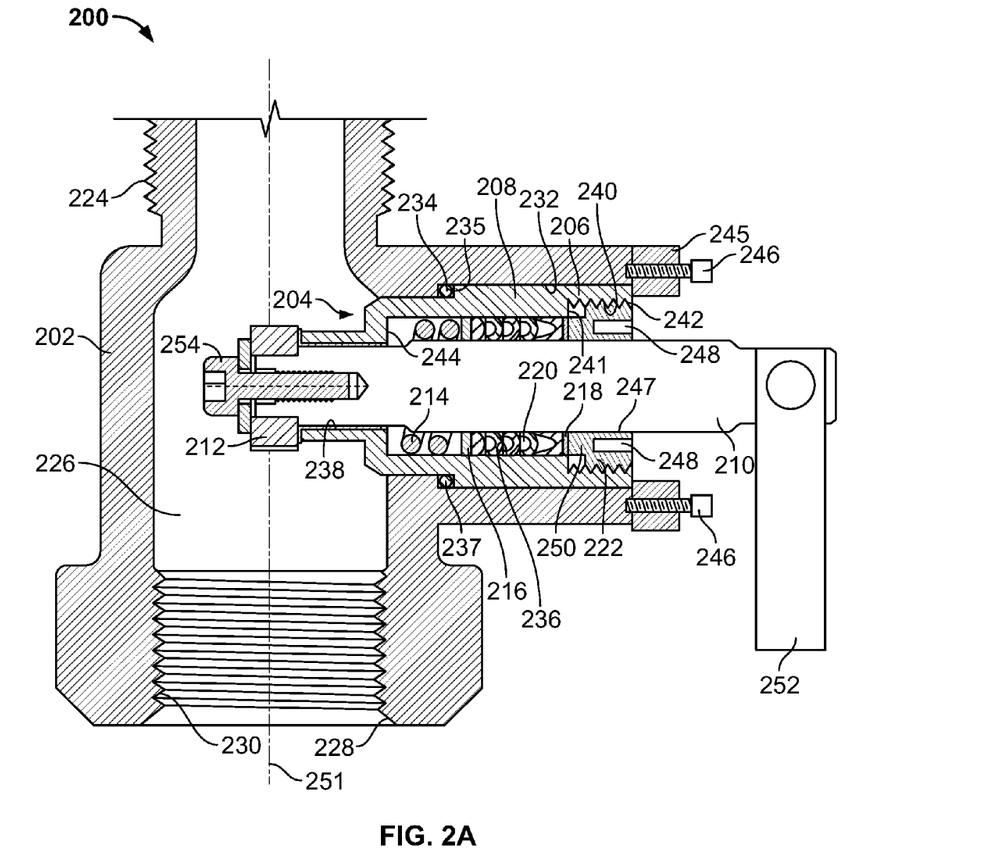
FIG. 2A depicts a portion of an example internal valve including an example field removable bonnet assembly.

FIG. 2A depicts a portion of an internal valve 200 that includes a body 202 and an example field removable bonnet assembly 204. The field removable bonnet assembly 204 includes a bonnet 206 having a body 208 and a shaft 210 coupled to a cam 212. Additionally, the field removable bonnet assembly 204 includes a spring 214, a first packing ring 216, a second packing ring 218, a valve packing 220 and an example removable adjuster 222. For clarity, certain portions of the internal valve 200 are excluded such as, for example, the stem assembly 138 and the poppet 104 of FIG. 1.

As discussed above, the body 202 includes exterior threads 224 that engage an opening (not shown) of a chamber or tank (not shown) such as a pumping system, a stationary storage tank, transport truck, etc. Additionally, the body 202 defines a first bore 226 having a first opening (not shown) (e.g., substantially similar to the first opening 114 of FIG. 1) and a second opening 228 to fluidly couple the chamber or tank to another chamber, a hose, a pipeline, etc. Specifically, the first bore 226 includes internal threads 230 to threadingly engage another body (not shown) such as, for example, a coupling of an LPG hose.

The body 202 defines a second bore 232 into which the field removable bonnet assembly 204 is positioned. A diameter of the second bore 232 substantially corresponds to a diameter of the body 208. Additionally, the second bore 232 defines a stepped portion 234, which is engaged by a stepped portion 235 of the body 208 via a seal 237 to properly position the field removable bonnet assembly 204 within the second bore 232. The seal 237 (e.g., an o-ring or gasket) is positioned between the stepped portions 234 and 235 to create a seal between the body 202 of the internal valve 200 and the body 208 of the bonnet 206 to substantially prevent fluid from exiting to the atmosphere through the second bore 232.

The body 208 of the bonnet 206 defines a first bore 236 and a second bore 238 that is smaller than the first bore 236. Generally, a diameter of the first bore 236 substantially corresponds to a diameter of the spring 214 that is positioned within the first bore 236, and a diameter of the second bore 238 corresponds to a diameter of the shaft 210. Additionally, the body 208 defines internal threads 240 that correspond to threads 242 of the removable adjuster 222. A stepped portion 241 is defined between the internal threads 240 and the first bore 236 to limit the movement of the removable adjuster 222. Specifically, the stepped portion 241 prevents the removable adjuster 222 from over compressing the spring 214 and/or the valve packing 220.

The spring 214 surrounds the shaft 210 and is positioned within the first bore 236 between a surface 244 of the first bore 236 and the first packing ring 216. The valve packing 220 surrounds the shaft 210 and is positioned within the first bore 236 between the first packing ring 216 and the second packing ring 218, which each at least partially surround the shaft 210. The second packing ring 218 is positioned between the valve packing 220 and the removable adjuster 222.

To couple the field removable bonnet assembly 204 to the body 202, the internal valve 200 is provided with a plate 245 that is coupled to the body 202 via a plurality of fasteners 246.

In practice, the spring 214 exerts a force against the valve packing 220 via the first packing ring 216 to compress the valve packing 220 and to urge the valve packing 220 against the shaft 210 to create a bubble tight seal that substantially prevents fluid from exiting to the atmosphere between the shaft 210 and the valve packing 220. The removable adjuster 222 is coaxially aligned with the first bore 236 and defines an aperture 247 that surrounds the shaft 210. Additionally, the removable adjuster 222 threadingly engages the internal threads 240 to position the spring 214, the first and second packing rings 216 and 218 and the valve packing 220 within the first bore 236.

Turning back to FIG. 1, as the spring 128 is exposed to substances and/or chemicals, a spring force of the spring 128 decreases, which reduces the force exerted against the packing ring 131 to urge the valve packing 130 against the shaft 122. Additionally, as the valve packing 130 is exposed to substances and/or chemicals, the bubble tight seal between the valve packing 130 and the shaft 122 diminishes, which may enable fluid to exit through the bonnet assembly 106. In practice, the fluid storage container in which the internal valve 100 is mounted may be located in a rural location in which repair technicians and/or replacement parts are not readily available. Unfortunately, if a bubble tight seal does not exist between the shaft 122 and the valve packing 130, the internal valve 100 may be inoperable and/or a considerable amount of fluid may exit through the bonnet assembly 106 before the internal valve 100 is repaired and/or replaced.

In contrast, the example field removable bonnet assembly 204 of FIG. 2A is provided with the removable adjuster 222 that is externally accessible to adjust the removable adjuster 222 relative to the body 208. Specifically, in some examples, the removable adjuster 222 defines a plurality of slots 248 that corresponds to a tool (not shown) to enable adjustment of the removable adjuster 222. In practice, if a bubble tight seal does not exist between the shaft 210 and the valve packing 220 and/or fluid is exiting to the atmosphere through the body 208 of the bonnet 206, the removable adjuster 222 may be manually turned (e.g., rotated) to increase the force against the valve packing 220. Specifically, manually turning the removable adjuster 222 compresses the valve packing 220 and causes the valve packing 220 to more tightly engage the shaft 210 to recreate a substantially bubble tight seal between the shaft 210 and the valve packing 220 to at least partially eliminate the flow of the fluid to the atmosphere. As the removable adjuster 222 is manually turned, a cylindrical member 250 of the removable adjuster 222 may move at least partially within the first bore 236 as it compresses the valve packing 220.

Figure 2B:
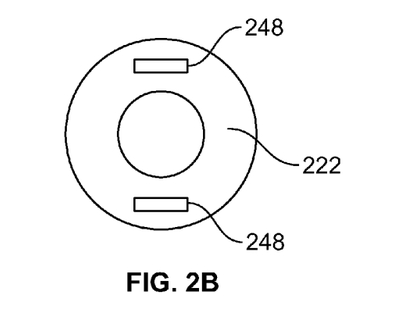
FIG. 2B depicts a top view of an example removable adjuster that may be used to implement the example field removable bonnet assembly of FIG. 2A in which a plurality of slots of the removable adjuster are substantially perpendicular to a longitudinal axis of the internal valve of FIG. 2A.
Figure 2C:
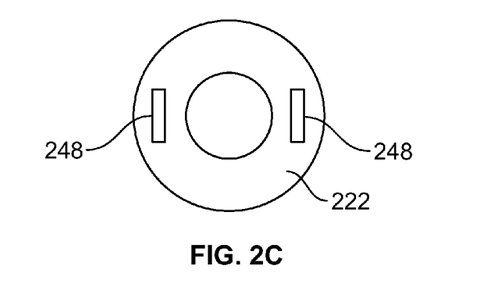
FIG. 2C depicts a top view of an example removable adjuster that may be used to implement the example field removable bonnet assembly of FIG. 2A in which the plurality of slots of the removable adjuster are substantially parallel to the longitudinal axis of the internal valve of FIG. 2A.

In some examples, the position of the slots 248 indicates the position of the removable adjuster 222 relative to the body 208. In practice, for example, if the slots 248 are approximately perpendicular to a longitudinal axis 251 of the body 202 of the internal valve 200, as shown in FIGS. 2A and 2B, the removable adjuster 222 may be able to compress the valve packing 220 an additional one-sixteenth of an inch before the removable adjuster 222 engages the stepped portion 241. Alternatively, for example, if the slots 248 are approximately parallel to the longitudinal axis 251 of the body 202 of the internal valve 200, as shown in FIG. 2C, the removable adjuster 222 may be able to compress the valve packing 220 an additional one-thirty second of an inch before the removable adjuster 222 engages the stepped portion 241.

The shaft 210 includes an external lever 252 to rotate the shaft 210 relative to the body 208 of the bonnet 206. The cam 212 is coupled to the shaft 210 via a fastener 254 opposite the external lever 252 and is positioned within the first bore 226. As the shaft 210 is rotated, the cam 212 engages the surface 136 (FIG. 1) to move the stem assembly 138 (FIG. 1) within the bore 112 (FIG. 1).

In practice, to equalize a pressure between a chamber or tank in which the internal valve 200 is mounted and the other chamber, hose, pipeline, etc. coupled to the second opening 228, the external lever 252 is rotated to position the cam 212 at a mid-point (e.g., 70° travel), which moves the stem assembly 138 (FIG. 1) to disengage the plug 146 (FIG. 1) from the seating surface 158 (FIG. 1) and positions the cut-away portion or groove 162 (FIG. 1) of the stem 140 (FIG. 1) adjacent to the aperture 160 (FIG. 1). As discussed above, positioning the cut-away portion or groove 162 (FIG. 1) adjacent to the aperture 160 (FIG. 1) increases the size of the fluid flow channel 164 (FIG. 1) between the stem 140 (FIG. 1) and the surface 166 (FIG. 1) of the aperture 160 (FIG. 1), which enables a relatively large amount of fluid to bleed between the chamber or tank and the other chamber, hose, pipeline, etc. to equalize the pressure across the internal valve 200.

Once the fluid pressure is equalized, the internal valve 200 may be fully opened. Specifically, the external lever 252 may be rotated to position the cam 212 at a high-point, which moves the stem assembly 138 (FIG. 1) to enable the seating surface 168 (FIG. 1) of the poppet 104 (FIG. 1) to disengage the surface 108 (FIG. 1) to allow fluid to flow from the other chamber, tank, etc. in which the internal valve 200 is mounted through the first opening 114 (FIG. 1). However, if the fluid flow increases to a magnitude greater than a predetermined fluid flow (e.g., an excess flow limit), a force exerted by the fluid flow against the external surface 170 (FIG. 1) of the poppet 104 (FIG. 1) overcomes a force exerted by the second spring 144 (FIG. 1) and causes the seating surface 168 (FIG. 1) of the poppet 104 (FIG. 1) to reengage the surface 108 (FIG. 1) even though the cam 212 is positioned at the high-point. In this position, while the seating surface 168 (FIG. 1) of the poppet 104 (FIG. 1) engages the surface 108 (FIG. 1), the plug 146 (FIG. 1) is at a distance from the seating surface 158 (FIG. 1) and the cylindrical portion 172 (FIG. 1) of the stem 140 (FIG. 1) is positioned adjacent the aperture 160 (FIG. 1). As discussed above, positioning the cylindrical portion 172 (FIG. 1) adjacent the aperture 160 (FIG. 1) decreases the size of the fluid flow channel 164 (FIG. 1) between the stem 140 (FIG. 1) and the surface 166 (FIG. 1) of the aperture 160 (FIG. 1), which enables a relatively small amount of fluid to bleed between the chamber or tank and the second opening 228.

To install (e.g., retrofit) and/or replace the example field removable bonnet assembly 204 on the internal valve 200, the fluid pressure is reduced (e.g., drained) from the chamber or tank and the plurality of fasteners 246 are then removed from the plate 245. The plate 245 is then removed from the body 202 and the field removable bonnet assembly 204 is then removed from the second bore 232. Next, the seal 237 is removed and replaced and then a replacement field removable bonnet assembly 204 is inserted into the second bore 232 until the stepped portion 235 of the body 208 is adjacent the seal 237. The plate 245 may then be reattached to the body 202, and the removable adjuster 222 may be adjusted to ensure a substantially bubble tight seal between the shaft 210 and the valve packing 220.

Alternatively, to replace the spring 214, the packing rings 216 and 218 and/or the valve packing 220 of the field removable bonnet assembly 204 while the field removable bonnet assembly 204 is coupled to the body 202 of the internal valve 200, the fluid pressure is reduced (e.g., drained) from the chamber or tank and the removable adjuster 222 is then removed from the body 208 of the bonnet 206. Next, the second packing ring 218, the valve packing 220, the first packing ring 216 and the spring 214 are removed and then replaced. The removable adjuster 222 may then be reattached to the body 208 and adjusted to compress the spring 214 to exert a force against the valve packing 220 to create a substantially bubble tight seal between the shaft 210 and the valve packing 220.

Figure 3:
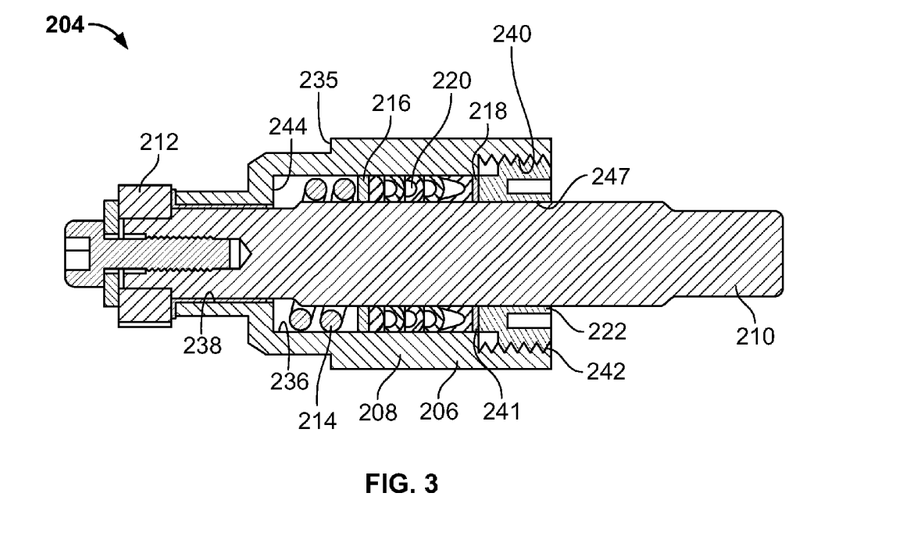
FIG. 3 depicts the example field removable bonnet assembly of FIG. 2A.

FIG. 3 depicts the field removable bonnet assembly 204 of FIG. 2A, which is separated from the internal valve 200 (FIG. 2A). Specifically, FIG. 3 depicts the field removable bonnet assembly 204 prior to being installed on the internal valve 200 (FIG. 2A). Reference numbers used in FIG. 3 are the same as reference numbers used in FIG. 2A in describing the field removable bonnet assembly 204. As such, the description relating to these reference numbers will not be repeated here.

Figure 4:
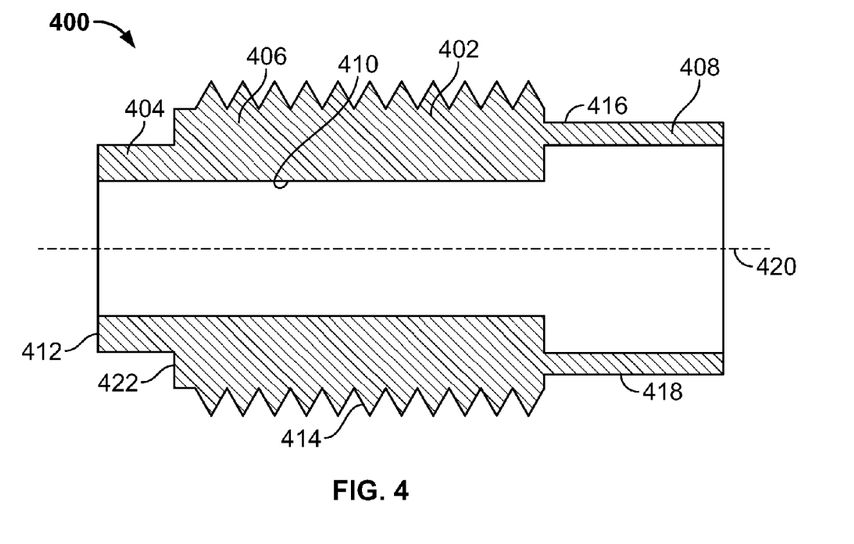
FIG. 4 depicts an alternative example removable adjuster that may be used to implement the field removable bonnet assembly of FIGS. 2A and 3.

FIG. 4 depicts an alternative example removable adjuster 400 that can be used to implement the field removable bonnet assembly 204 of FIGS. 2A and 3. The removable adjuster includes a body 402 having a cylindrical member 404, a central portion 406 and an elongated member 408. The body 402 defines an aperture 410 to receive the stem 210 (FIG. 2A).

The cylindrical member 404 may be moved within the first bore 236 (FIG. 2A) of the bonnet 206 (FIG. 2A) as the removable adjuster 400 is adjusted. Additionally, the cylindrical member 404 has a surface 412 that engages the second packing ring 218 (FIG. 2A). The central portion 406 is provided with external threads 414 that are to threadingly engage the internal threads 240 (FIG. 2A) of the bonnet 206 (FIG. 2A).

If the removable adjuster 400 threadingly engages the internal threads 240 (FIG. 2A), the elongated member 408 extends from the bonnet 206. The elongated member 408 has a surface 416 that may be engaged by a tool and/or wrench (not shown) to turn (e.g., rotate) the removable adjuster 400 relative to the bonnet 206 (FIG. 2A). In some examples, the elongated member 408 may have a hexagonal profile. However, the elongated member 408 may have any other suitable profile. Additionally, the surface 416 may include a laser marking 418 or any other suitable indicator to indicate the position of the removable adjuster 400 relative to the body 208 (FIG. 2A). In practice, for example, if the laser marking 418 is substantially parallel to a longitudinal axis 420 of the body 402 and the laser marking 418 is positioned toward the first opening 114 (FIG. 1), the removable adjuster 400 may be adjusted to compress the valve packing 220 (FIG. 2A) an additional one-sixteenth of an inch before a surface 422 of the removable adjuster 400 engages the stepped portion 241 (FIG. 2A). Alternatively, for example, if the laser marking 418 is substantially parallel to the longitudinal axis 420 of the body 402 and the laser marking 418 is positioned toward the second opening 228 (FIG. 2A), the removable adjuster 400 may be adjusted to compress the valve packing 220 an additional one-thirty second of an inch before the surface 422 of the removable adjuster 400 engages the stepped portion 241 (FIG. 2A).

Figure 5:
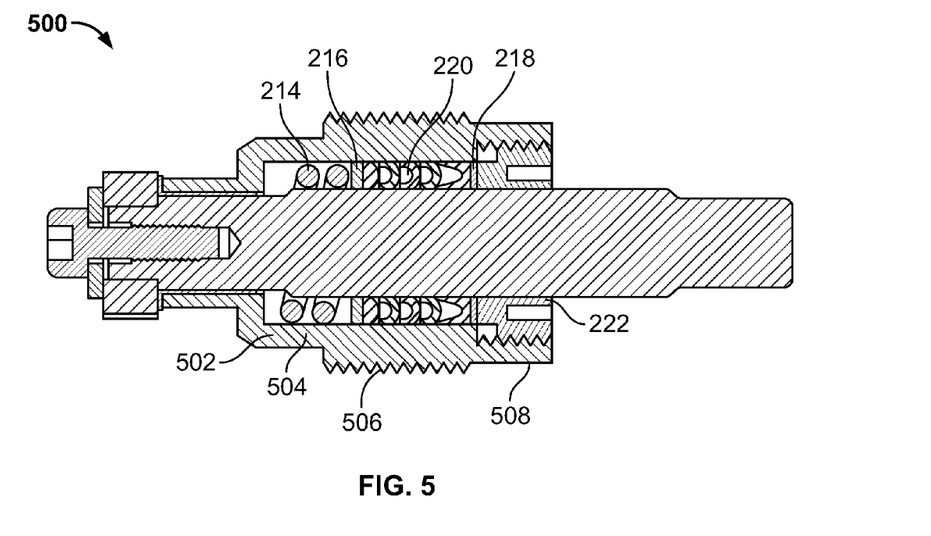
FIG. 5 depicts an alternative example field removable bonnet assembly that may be used to implement the internal valve of FIG. 2A.

FIG. 5 depicts an alternative field removable bonnet assembly 500 that may be used to implement the internal valve 200 of FIG. 2A. The field removable bonnet assembly 500 is substantially similar to the field removable bonnet assembly 204 (FIG. 2A). Reference numbers used in FIG. 5 that are the same as the reference numbers used in FIG. 2A correspond to portions on the field removable bonnet assembly 500 that are the same or substantially similar to the portions on the field removable bonnet assembly 204 (FIG. 2A). As such, the description relating to these reference numbers will not be repeated here.

As described above, the field removable bonnet assembly 500 includes a bonnet 502 having a body 504 and the shaft 210 coupled to the cam 212. Additionally, the field removable bonnet assembly 500 includes the spring 214, the first packing ring 216, the second packing ring 218, the valve packing 220 and the removable adjuster 222.

In contrast to the field removable bonnet assembly 204 of FIG. 2A, the body 504 includes exterior threads 506 that correspond to internal threads (not shown) on the second bore 232 (FIG. 2A) to couple the field removable bonnet assembly 500 to the internal valve 200 (FIG. 2A). In practice, to couple the field removable bonnet assembly 500 to the internal valve 200, the exterior threads 506 are threaded into the internal threads of the second bore 232 (FIG. 2A). In this example, a portion 508 of the bonnet 502 may extend from the body 202 to enable a tool (not shown) to engage the portion 508 to rotate the field removable bonnet assembly 500 relative to the internal valve 200 (FIG. 2A) to ensure that the field removable bonnet assembly 500 is properly positioned within the second bore 232 (FIG. 2A).

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An internal valve, comprising:
an internal valve body comprising external threads, a first chamber having first internal threads, and a second chamber having second internal threads, the external threads to threadably engage another body having a pressurized chamber, a longitudinal axis of the first chamber being substantially perpendicularly positioned relative to a longitudinal axis of the second chamber; and
a field removable bonnet assembly, comprising:
a body having threads about an exterior surface to threadably engage the second internal threads to couple the body to the internal valve body;
a shaft to be at least partially positioned within the body; and
an adjuster comprising a first adjuster portion and a second adjuster portion, the body defining a bore having a first diameter portion and a second diameter portion larger than the first diameter portion, the first diameter portion to receive a valve packing, the second diameter portion to be threadably engaged by the second adjuster portion, wherein the adjuster is externally accessible to adjust the first adjuster portion within the first diameter portion to change a force exerted by the valve packing on the shaft.

2. The internal valve of claim 1, wherein the adjuster is entirely positioned within the body.

3. The internal valve of claim 1, wherein the adjuster is field removable to replace or repair the valve packing.

4. The internal valve of claim 1, further comprising a stepped portion between the first diameter portion and the second diameter portion.

5. The internal valve of claim 4, wherein the adjuster comprises a step between the first adjuster portion and the second adjuster portion, the step to engage the stepped portion and substantially prevent the adjuster from over compressing the valve packing.

6. The internal valve of claim 4, wherein the adjuster comprises a step to engage the stepped portion to limit the movement of the adjuster relative to the body.

7. The internal valve of claim 1, wherein the body threadably engages the internal valve to removably couple the body to the internal valve.

8. The internal valve of claim 1, wherein the second adjuster portion defines one or more slots to be engaged by a tool to enable the first adjuster portion to be adjusted within the first diameter portion.

9. The internal valve of claim 8, wherein a position of the one or more slots is to indicate an adjustment position of the removable adjuster relative to the body.

10. The internal valve of claim 1, wherein the adjuster comprises an indicator to indicate an adjustment position of the adjuster relative to the body.

11. The internal valve of claim 1, wherein the adjuster comprises an elongated member that extends from the second body to enable the adjustment of the removable adjuster relative to the second body.

12. An internal valve, comprising:
an internal valve body comprising external threads, a first chamber having first internal threads, and a second chamber having second internal threads, the external threads to threadably engage another body having a pressurized chamber, a longitudinal axis of the first chamber being substantially perpendicularly positioned relative to a longitudinal axis of the second chamber;
a stem; and
a field removable bonnet assembly, comprising:
a body to be positioned in the second chamber, the body having threads about an exterior surface to threadably engage the second internal threads to removably couple the body to the internal valve body, the body defining a bore to receive a valve packing;
a shaft to be at least partially positioned within the bore; and
an adjuster to be entirely positioned within the bore and externally accessible to adjust the adjuster and change a force exerted by the valve packing on the shaft.

13. The internal valve of claim 12, wherein the adjuster comprises a first adjuster portion and a second adjuster portion, the bore having a first diameter portion to receive the valve packing and a second diameter portion larger than the first diameter portion.

14. The internal valve of claim 13, wherein the second diameter portion is to be threadably engaged by the second adjuster portion, and wherein the adjuster is externally accessible to adjust the first adjuster portion within the first diameter portion to change the force exerted by the valve packing on the shaft.

15. The internal valve of claim 12, wherein the adjuster is field removable to replace or repair the valve packing.

16. The internal valve of claim 12, further comprising a stepped portion within the bore to be engaged by a portion of the adjuster and substantially prevent the adjuster from over compressing the valve packing.

17. The internal valve of claim 12, wherein the adjuster defines one or more slots to be engaged by a tool to enable the first adjuster portion to be adjusted within the first diameter portion.

* * * * *